N. METZ.
COFFEE-ROASTER.

No. 189,124.  Patented April 3, 1877.

Witnesses:
Chas. N. Peck
Leo. Greulich

Inventor:
Nicholas Metz
by his Atty's
Peck & Co.

United States Patent Office.

NICHOLAS METZ, OF DAYTON, OHIO.

IMPROVEMENT IN COFFEE-ROASTERS.

Specification forming part of Letters Patent No. 189,124, dated April 3, 1877; application filed March 12, 1877.

*To all whom it may concern:*

Be it known that I, NICHOLAS METZ, of Dayton, in the county of Montgomery and State of Ohio, have invented certain new and useful Improvements in Coffee-Roasters; and I do hereby declare the following to be a full, clear, and exact description of the same.

This invention relates to that class of coffee-roasters designed as utensils to be placed on common cooking-stoves after removing the front plates and center piece. Most roasters of this class have a revolving sheet-metal prism to contain the coffee, and are provided with various devices for agitating it and shielding the prism from the fire.

The object of my invention is to provide a simple, cheap, and effective roaster; and the novelty of my improvement consists in the combination, with a heat-retaining casing, of a peculiarly constructed and arranged octagonal sheet-metal prism, provided with a crank and door, all as will be herein specified.

Figure 1:
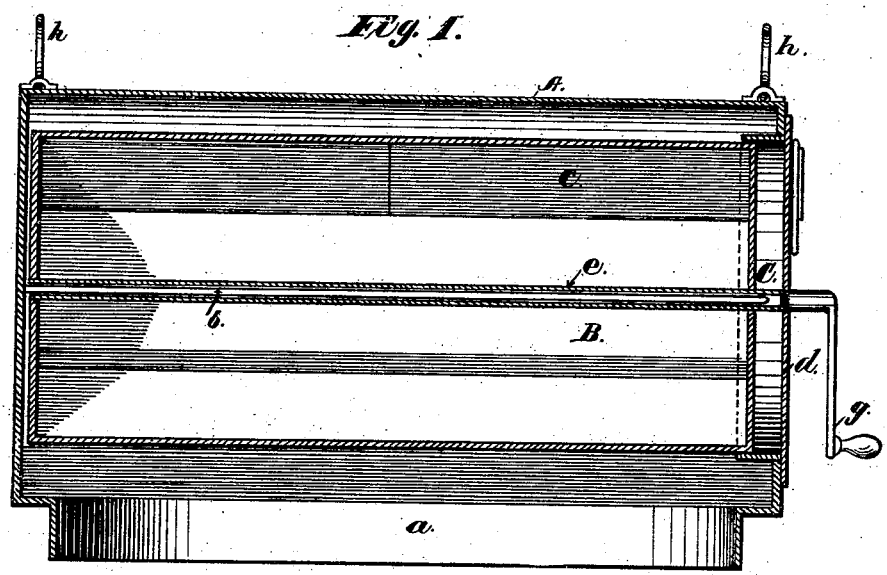
Figure 2:
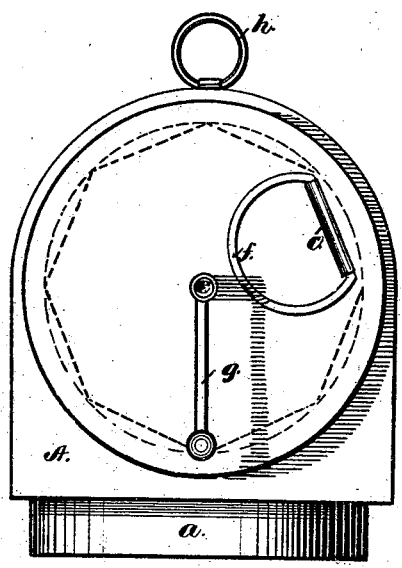

Figure 1 represents a central longitudinal section, in elevation, of my improved coffee-roaster. Fig. 2 is an end elevation of the same.

A is a sheet-metal casing, of the shape represented, provided with a bottom flange, $a$, that fits into the opening made by removing the two front plates and the center piece of the stove. This casing has no bottom, so that the heat from the fire circulates freely through it. There is a circular opening in one end of the casing, and at a point opposite the center of this opening is secured the end of a rod, $b$, to the opposite inner side of the casing. B is an octagonal sheet-metal prism, provided with a sliding door, $c$, to one of its sides. One end of this prism is secured in a narrow circumscribed sheet-metal sleeve, C, that fits snugly in the circular opening before referred to, and is provided with a head, $d$, that covers said opening. Extending axially through the prism B is a tube, $e$, with one end open and just large enough to be slipped freely over the rod $b$. The end of the sliding door $c$ passes through the head $d$, and is bent into a loop to hold a ring, $f$. The tube $e$ continues through the head $d$, and terminates in a crank with a handle, $g$, as shown. For convenience in handling the roaster, two rings, $h$, are pivoted, one at each end of the top of the casing.

It will be noticed that the prism is axially pivoted upon the rod $b$, which acts as a guide in slipping it into the casing, and supports its inner end, and also, by means of the connected sleeve C, it is journaled in one end of the casing.

When it is desired to place coffee in the prism, it is drawn out from the casing sufficiently to expose the sliding door, which is opened. The green coffee is then placed in the cylinder, the slide is closed, and the prism slipped into the casing, as shown. The roaster is then placed over the fire, as before indicated, and the prism is revolved.

It will be noticed that the heat is confined by the casing all around the prism and hastens the process of roasting.

When the coffee is sufficiently browned, the roaster is removed from the fire, and by revolving the prism until the door comes undermost the slide can be drawn out and the coffee emptied where desired; or the prism may be removed from the casing before opening the slide.

What I claim is—

The herein-described coffee-roaster, consisting of the casing A, with flanged bottom and rod $b$, attached to one end thereof, at a point opposite to the center of a circular opening in the other end, and prism B, with its axial tube $e$, headed sleeve C, sliding door $c$, and crank $g$, the whole constructed and arranged as and for the purpose specified.

Witness my hand this 3d day of March, A. D. 1877.

NICHOLAS METZ.

Witnesses:
   CHAS. M. PECK,
   WM. RITCHIE.